United States Patent [19]
Taylor et al.

[11] Patent Number: 6,095,183
[45] Date of Patent: Aug. 1, 2000

[54] SAFETY RELIEF VALVE

[76] Inventors: Julian S. Taylor; Mason Buerger, both of 8300 SW. 8th., Oklahoma City, Okla. 73128

[21] Appl. No.: 09/144,605

[22] Filed: Aug. 31, 1998

[51] Int. Cl.[7] .................................................. F16K 17/20
[52] U.S. Cl. ........................................... 137/475; 137/476
[58] Field of Search ................................... 137/475, 477, 137/476, 514.5, 514.7, 469

[56] References Cited

U.S. PATENT DOCUMENTS

| | | | |
|---|---|---|---|
| 1,696,452 | 12/1928 | Raymond | 137/477 |
| 3,411,530 | 11/1968 | Powell | 137/475 |
| 3,520,326 | 7/1970 | Bowen et al. | 137/477 |
| 3,757,815 | 9/1973 | Orr | 137/476 |

*Primary Examiner*—David J. Walczak
*Attorney, Agent, or Firm*—Robert K. Rhea

[57] ABSTRACT

A spring urged pressure relief valve, having a seat and a valve moved toward and away from the seat, is provided with a valve stem surrounding bushing forming a bushing chamber in combination with a disk on the valve stem. The bushing is provided with an adjustable control port to control fluid pressure assisting the spring closing the valve and controlling blowdown of the valve.

8 Claims, 2 Drawing Sheets

SAFETY RELIEF VALVE

BACKGROUND OF THE INVENTION

This invention relates to safety relief valves of the direct spring closing type which automatically closes after being opened.

1. Field of the Invention

Direct spring operated safety relief valves for controlling fluid pressure are known.

2. Description of the Prior Art

The most pertinent patent is believed U.S. Pat. No. 3,411,530 issued Nov. 19, 1968 to Powell for Pressure Operated Pop Valve. This patent discloses a spring-type pressure responsive relief valve which features a valve closing a seat between inlet and outlet ports, and includes a cage surrounding the valve within the valve body has restrictive outlet ports for restricting the flow through the valve when opened by excessive pressure. A port feeds the upstream pressure into the bonnet of the gate valve surrounding the release spring for generating fluid pressure which assists the spring in closing the valve by creating an unbalanced fluid pressure force against the valve to move it to a valve seat closed position.

This invention improves the self closing action of such a valve by providing a pressure chamber adjacent the downstream side of a disk surrounding the valve opposite the seat.

BRIEF SUMMARY OF THE INVENTION

A right angle valve body is provided with a horizontal valve seat between its inlet and outlet normally closed by a spring urged valve having a stem within a bonnet secured to the valve body. A bushing surrounds the valve stem adjacent the valve seat and forms a valve closing pressure chamber communicating with the system pressure through an orifice when the valve is opened by pressure above a predetermined set pressure unseating the valve. A pressure adjusting screw threadedly supported by the valve body opens a port in the valve closing pressure chamber for adjusting the amount of developed back pressure control blowdown independently of set pressure.

The principal object of this invention is to provide a direct spring operated safety release valve having a bushing slidably guiding the valve stem in the valve opening and closing action, and having a wall surrounding the valve stem forming a valve reseating bushing pressure chamber for spring assistance in reseating the safety valve after a pressure release opening action.

DETAILED DESCRIPTION OF THE INVENTION

Figure 1:
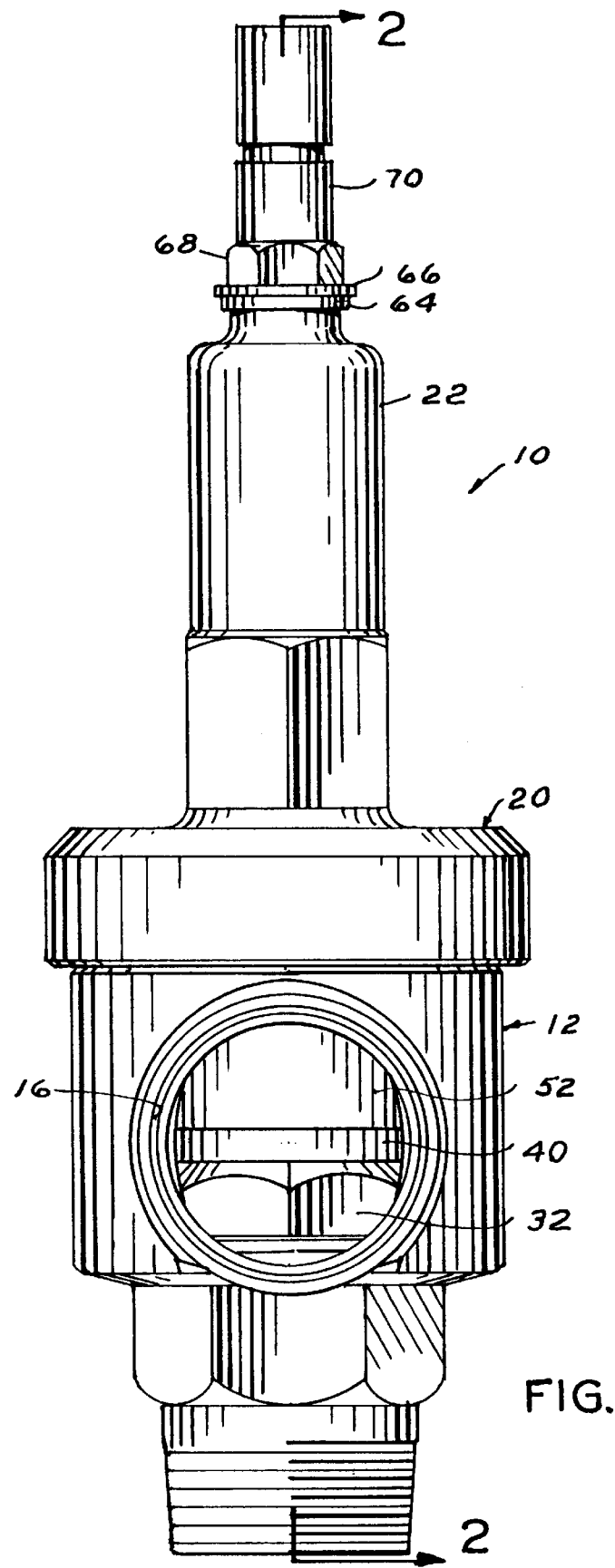
FIG. 1 is a side elevational view of the valve.

Like characters of reference designate like parts in those figures of the drawings in which they occur.

In the drawings:

The reference numeral 10 indicates the valve as a whole comprising a body 12 having an inlet port 14 adapted to be connected with a pipe or vessel to be monitored. A lateral outlet port 16 similarly adapted to be connected with a pipe or the like forms a fluid passageway 18 and outer chamber 19 in the valve body, as presently described. A bonnet 20 having a weep hole 21 and a tubular stem 22 axially closes the end of the valve body opposite its inlet port 14.

A tubular valve seat support 24 has an annular outstanding flange 26 at its upstream end and a rabbeted end edge portion at its downstream end 28 to axially receive a valve orifice seat insert 30 having a cooperating rabbeted edge. An orifice seat body 32 having a downstream converging end surface 33 surrounds the valve seat support 24 and valve seat insert 30 and impinges the valve seat support flange 26 against a downstream facing valve body shoulder 34.

Figure 2:
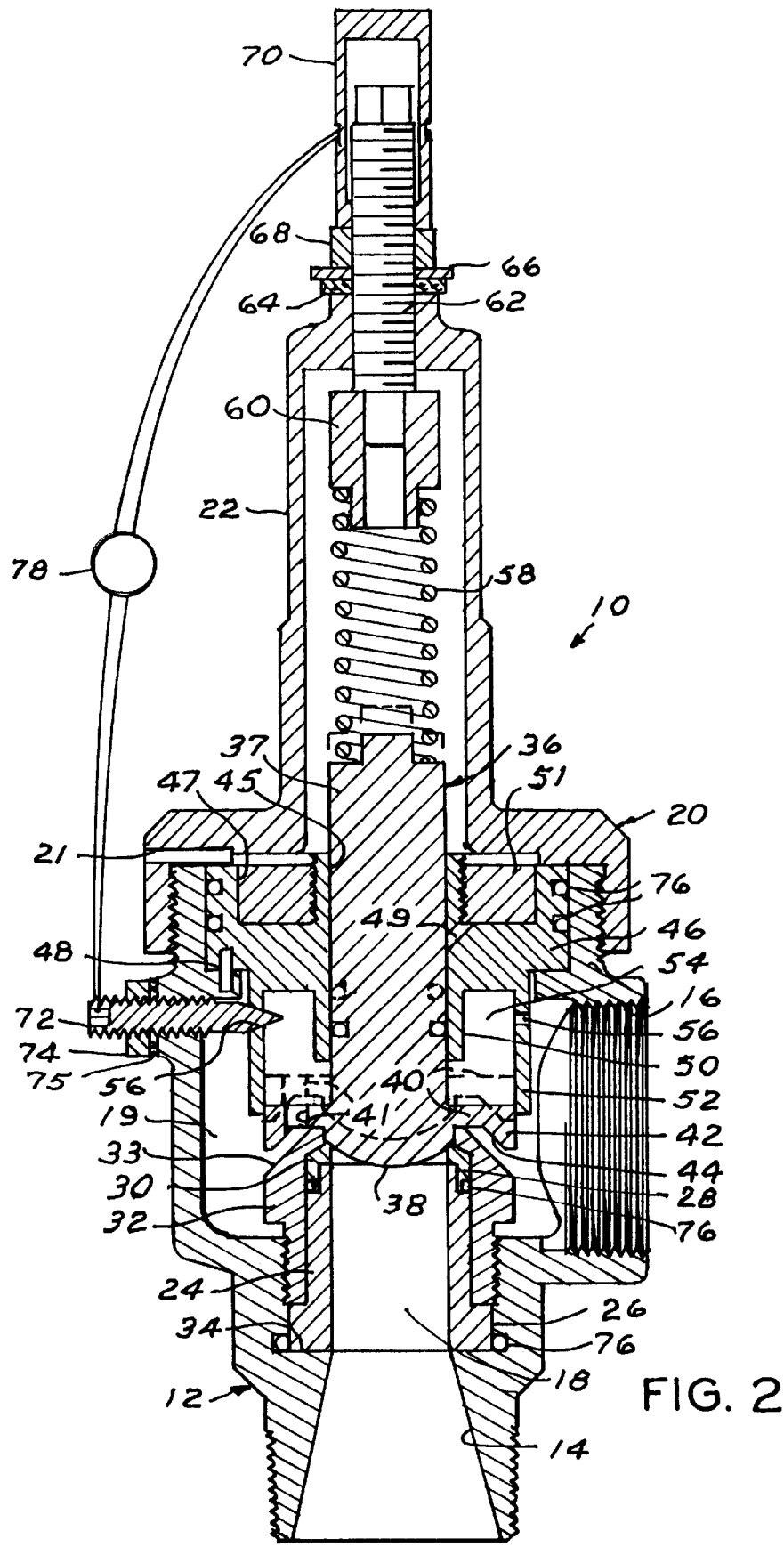
FIG. 2 is a vertical cross sectional view taken substantially along the line 2—2 of FIG. 1 and illustrating the valve open position by dotted lines.

An axial valve 36 having a stem 37 and part hemispherical depending face surface 38, as viewed in FIG. 2, seals fluid tight with the orifice seat 30. The valve 36 further includes an outstanding flange forming an orifice lift disk 40, having a vertical bore 41, and a depending skirt 42 characterized by a downward and outwardly diverging surface 44 normally disposed in spaced apart relation with respect to the downstream converging end wall surface 33 of the valve seat body 32.

The central bore 45 of a guide bushing 46 surrounding an intermediate portion of the valve stem 37 is interposed in the valve body between the bonnet 20 and valve seat body 32 and is indexed with the valve body by a guide pin 48. The depending end portion of the bushing 46 is provided with an inner annular wall 50 adjacent the periphery of the stem 37 and an outer annular wall 52 slidably receiving the periphery of the disk 40 during valve opening movement, as presently explained. The bushing wall 52 forms an inner pressure chamber 54 around the valve stem 37 above the disk 40 for the purposes presently explained. The bushing outer wall 52 is provided with bushing chamber control ports 56 communicating with the valve body outlet port 16.

Between its inner and outer peripheries the end surface of the bushing 46 opposite the disk 40 is provided with an annular recess 47 which communicates with the bore 45 of the bushing through an oil drain aperture 49. The recess 47 is filled with an annular valve stem seal means, such as oil seal packing 51 to provide lubrication for the stem 37 through the aperture 49.

A helical spring 58 is axially interposed in the bonnet between the stem 37 and one end of a spring keeper 60. The keeper 60 journals one end of an adjusting screw 62 threadedly received by the downstream end portion of the bonnet 22. Manual angular rotation of the adjusting screw 62 compresses the spring 58 to achieve the desired set pressure for release opening of the valve 10, as is conventional with spring controlled pressure relief valves. The spring adjusting screw 62 is secured by a thread lubricator 64 and washer 66 interposed between a jam nut 68 and the bonnet 20. The exposed thread portion of the adjusting screw 62 is surrounded by a thread protector cap 70.

A needle valve 72, threadedly supported by the valve body projects through the outer wall 52 forming the inner bushing chamber 54 to externally adjust blowdown pressure therein. The adjusted setting of the needle valve 72 is secured by a jam nut 74 with a thread seal 75 under the nut. The needle valve setting is safety wire sealed with the thread protector 70, as at 78. A plurality of 0-rings 76 between mating parts seal the fluid passageway and outer and inner chambers against fluid leakage.

OPERATION

System pressure is applied to the valve face 38 from the inlet port 14. This upward system pressure is counteracted by the downward force of the spring 58. When the system pressure is below set pressure the pressure in the inner bushing chamber 54 and the outer chamber 19 is atmospheric with the outlet port or back pressure, if any therein.

The transverse cross section area of the stem 37 is approximately equal with the effective cross section area of the valve surface 38 on the seal 30. Thus any downstream system back pressure, through the port 16 is balanced out so that the set pressure is not changed. A common method of balancing out back pressure is by using a bellows, not shown, but this equal area method is effective and more reliable.

If the system pressure increases to the point where the total upward force overcomes the spring force, the valve opens. At such pressure the initial flow across the valve seat 30 is exposed to the additional area of the disk 40 which generates additional lifting forces. system pressure entering the bushing chamber 54 through the disk aperture 41 quickly generates a developed back pressure in the bushing chamber 54 so that initially the pressure above and below the disk will be equalized. However, this pressure in the bushing chamber 54 then acts on the surface area of the disk 40 opposite the valve seat 30 as a supplementary force to assist the spring 58 in closing the valve 36. After valve reseating residual pressure in the bushing chamber 54 immediately dissipates through the control ports 56 to the valve outlet 16 or to the superimposed back pressure, if any. This completes one cycle of operation.

Obviously the invention is susceptible to changes or alterations without defeating its practicability. Therefore, we do not wish to be confined to the preferred embodiment 1 shown in the drawing and described herein.

We claim:

1. A relief valve, comprising:

a valve body having inlet and outlet ports;

a valve seat disposed within the valve body between the inlet and outlet ports;

a valve having a stem moveable toward and away from said seat to stop communication between said inlet and outlet ports;

means normally biasing said valve to seat on said seat, said valve stem having a disk adjacent said seat and being responsive to fluid pressure on the upstream and downstream sides of said seat;

bushing means surrounding said valve stem including a wall slidably receiving said disk for forming a bushing pressure chamber around the valve stem adjacent said disk, said bushing wall having control ports, said control ports forming the only fluid communication between the bushing pressure chamber and the outlet port;

a fluid passage through said disk communicating upstream fluid pressure with the bushing chamber when the upstream fluid pressure unseats said valve; and, adjustable flow control means supported by the body and coacting with one of the control ports for controlling the fluid flow through said one control port to thereby create a fluid back pressure within said bushing chamber for cooperating with said valve biasing means to close said seat.

2. The relief valve according to claim 1 wherein said adjustable flow control means comprises:

a threaded needle valve extending into said valve body and having an inward tapered end portion axially disposed in said one control port whereby angular rotation of the needle valve will position said tapered end portion with respect to the control port to control the restriction of the control port for controlling the volume of blowdown of said relief valve.

3. The relief valve according to claim 2 including:

means orienting said bushing means within said valve body whereby said adjustable flow control means may coact with said one control port to control the flow therethrough.

4. A relief valve, comprising:

a valve body having inlet and outlet ports;

a valve seat disposed within the valve body between the inlet and outlet ports;

a valve having a stem moveable toward and away from said seat to stop communication between said inlet and outlet ports;

means normally biasing said valve to a seated position on said seat, said valve being movable responsive to said biasing means and to fluid pressures on upstream and downstream sides of said seat;

said valve stem having a disk adjacent said seat responsive to fluid pressure on the upstream and downstream sides of said seat;

bushing means surrounding said valve stem including a wall slidably receiving said disk for forming a bushing pressure chamber around the valve stem adjacent said disk, said bushing wall having control ports, said control ports forming the only fluid communication between the bushing pressure chamber and the outlet port;

a fluid passage through said disk communicating upstream fluid pressure with the bushing chamber when the upstream fluid pressure unseats said valve; and, adjustable flow control means supported by the body and coacting with one of the control ports for controlling the fluid flow through said. one control port to thereby create a fluid back pressure within said bushing chamber for cooperating with said valve biasing means to close said seat.

5. The relief valve according to claim 4 wherein said adjustable flow control means comprises:

a threaded needle valve extending into said valve body and having an inward tapered end portion axially disposed in said one control port whereby angular rotation of the needle valve will position said tapered end portion with respect to the control port to control the restriction of the control port for controlling the volume of blowdown of said relief valve.

6. The relief valve according to claim 1 in which the transverse cross sectional area of said valve stem is substantially equal with the cross sectional area of the valve seat for balancing downstream pressure and further including;

annular valve stem seal means for precluding pressure leakage from the inner bushing chamber.

7. The relief valve according to claim 6 and further including:

annular oil seal means in the bushing communicating with the valve stem for lubricating the latter.

8. The relief valve according to claim 5 including:

means orienting said bushing means within said valve body whereby said adjustable flow control means may coact with said one control port to control the flow therethrough.

* * * * *